(12) United States Patent
Hutchins et al.

(10) Patent No.: US 6,657,635 B1
(45) Date of Patent: Dec. 2, 2003

(54) BINNING FLUSH IN GRAPHICS DATA PROCESSING

(75) Inventors: Edward Hutchins, Mountain View, CA (US); Ming Benjamin Zhu, San Jose, CA (US); Sanjay O. Gupta, Fremont, CA (US); Scott C. Heeschen, Campbell, CA (US); Benjamin J. Garlick, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 463 days.

(21) Appl. No.: 09/654,104

(22) Filed: Aug. 31, 2000

Related U.S. Application Data (60) Provisional application No. 60/152,314, filed on Sep. 3, 1999.

(51) Int. Cl.[7] .................. G06F 12/02; G06F 12/00; G06F 13/28; G06F 12/14; G06F 12/16; G06F 13/00

(52) U.S. Cl. .................. 345/543; 711/135; 711/171

(58) Field of Search .................. 345/423, 582, 345/419, 427, 555, 572, 552, 540, 418, 421; 711/135, 120

(56) References Cited

U.S. PATENT DOCUMENTS

| | | | |
|---|---|---|---|
| 5,920,687 A | | 7/1999 | Winner et al. ............... 395/122 |
| 6,279,080 B1 | * | 8/2001 | DeRoo ........................ 711/135 |
| 6,424,345 B1 | * | 7/2002 | Smith et al. ................. 345/423 |

* cited by examiner

*Primary Examiner*—Matthew C. Bella
*Assistant Examiner*—Dalip K Singh
(74) *Attorney, Agent, or Firm*—Townsend and Townsend and Crew LLP (57) ABSTRACT

Methods and systems for optimizing graphics data processing employ various binning flush algorithms to optimize the utilization of binning memory in a graphics system. Binning flush algorithms provide for processing all geometry and commands binned up to the point the binning memory becomes unavailable, and storing and restoring all necessary intermediate data generated during the partial tile rendering.

29 Claims, 6 Drawing Sheets

BINNING FLUSH IN GRAPHICS DATA PROCESSING

The present application derives priority from provisionally filed U.S. patent application No. 60/152,314, filed Sep. 3, 1999, titled "Binning Flush in Graphics Data Processing," which is hereby incorporated by reference in its entirety.

BACKGROUND OF THE INVENTION

The present invention relates in general to graphics data processing, and in particular to methods and systems for performing binning flush in three-dimensional (3-D) graphics pipelines that use tiled architecture.

Limited memory bandwidth has been a major obstacle in improving the performance of traditional 3-D graphics pipelines. Tiling or "chunking" has evolved as an alternative architecture that reduces the demand on memory bandwidth in 3-D graphics pipelines. A graphics pipeline using tiling architecture segments the rasterization area into a regular grid of tiles. Input geometry and commands are then "binned" into separate memory regions for each tile, such that only the geometry and commands which affect rasterization of a given tile need be read by the rasterization hardware. By storing, for example, one tile worth of data in memory that is local to the processor, main memory bandwidth requirements are significantly reduced. A preferred embodiment for binning of graphics data is described in detail in commonly-assigned patent application Ser. No. 09/271,636, filed Mar. 17, 1999, entitled "Optimized System and Method for Binning of Graphics Data," by Zhu et al., which is hereby incorporated by reference in its entirety.

Infinite rendering applications where a scene or image may result in unbounded input geometry and commands (e.g. an infinite loop to draw triangles onto the screen) pose a potential problem in this type of graphics data binning. This is so because such infinite rendering images often exhaust the finite amount of memory that is available for such a tiled architecture. The processor must therefore be able to handle these types of images, or other conditions under which binning memory becomes unavailable, without compromising the performance of the graphics pipeline.

SUMMARY OF THE INVENTION

The present invention offers methods and apparatus for flushing binning memory in a 3-D graphics system to address situations where binning memory may become unavailable before binning for a frame has been completed. Broadly, according to the present invention, once it is determined that a binning memory flush must occur (e.g., binning memory is exhausted), geometry and commands binned up to that point are processed (rendered), and the results temporarily stored. As binning memory becomes available again, the necessary intermediate data generated during the partial tile rendering are restored and binning continues. In a specific implementation, the flush is performed on a tile by tile basis. In an alternate implementation, more efficient use of memory is made by flushing directly into other existing memory resources instead of, or in combination with, intermediate buffers.

Accordingly, in one embodiment, the present invention provides a binning flush process that includes generating a flush signal when binning memory becomes unavailable; in response to the flush signal, for each tile, rendering geometry binned and storing the results into intermediate buffers; binning restore commands, the restore commands restoring data generated during partial tile rendering; and continuing with binning input geometry and commands.

In another embodiment, the present invention provides a binning flush process that includes generating a flush signal when binning memory becomes unavailable; in response to the flush signal, selecting preferably the tile which contains the largest amount of binned data; copying the tile descriptor for the selected tile to a special tile descriptor, and marking the original tile descriptor as "empty", allowing binning to continue; rendering geometry binned for the selected tile which frees binning memory associated with this tile as it is processed; storing the results of the rendering process into memory; binning restore commands for the selected tile; and continuing binning.

These and other features and advantages of the present invention will be better understood with reference to the detailed description below and the accompanying diagrams.

DESCRIPTION OF THE SPECIFIC EMBODIMENTS

Figure 1:
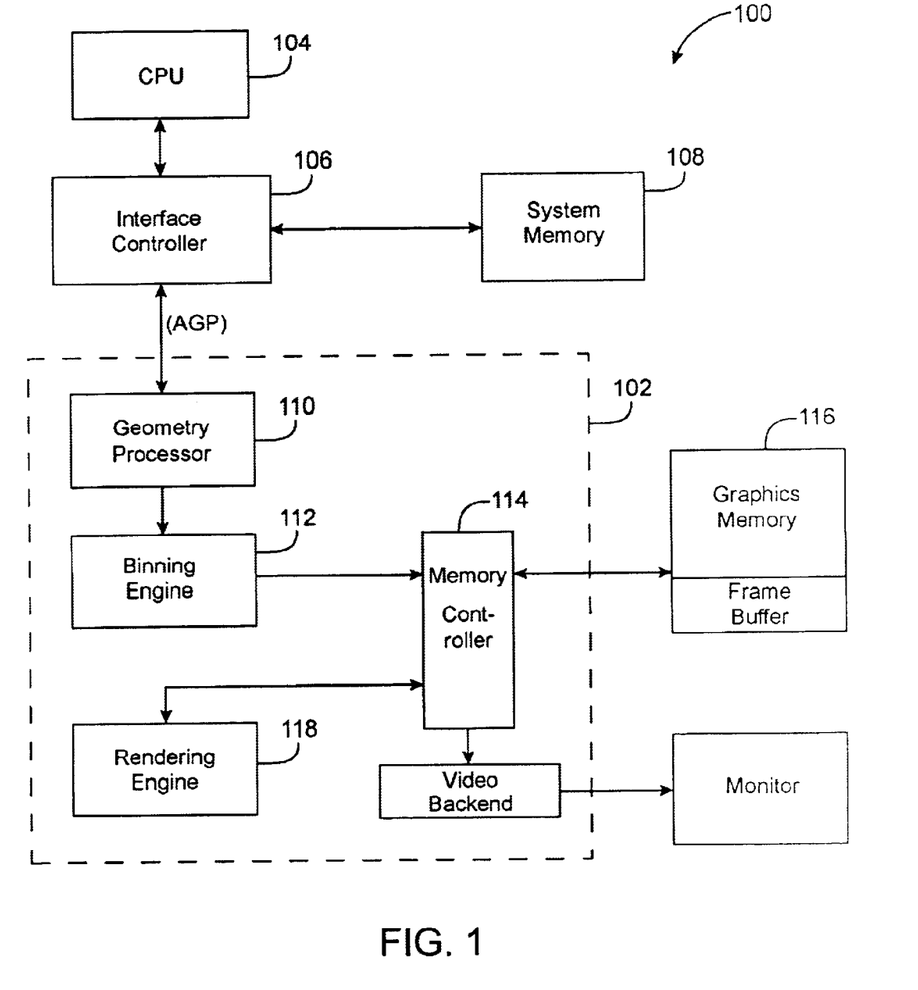
FIG. 1 is a graphics system that processes graphics data in accordance with an embodiment of the present invention.

FIG. 1 is a block diagram of a graphics system 100 that processes graphics data in accordance with an embodiment of the present invention. A graphics processor 102 is coupled to a central processing unit (CPU) 104 by a bus, such as an advanced graphics protocol (AGP) bus, via an interface controller 106. System memory 108 also couples to CPU 104 via interface controller 106. Graphics processor 102 includes a geometry processor 110 that receives graphics data from CPU 104. Graphics data typically includes geometry data and mode data. Geometry data comprises information relating to various polygons (e.g., triangles, parallelograms, rectangles, circles, etc.) which are processed to produce a complete image. Geometry data specifies, for example, the vertices (e.g., in X,Y,Z coordinates) and color (e.g., red-green-blue (RGB)) combinations for various polygons. Mode data comprises information relating to various modes affecting the appearance of one or more geometries when displayed. For example, for a given geometry, mode data can define or specify one or more "textures" (e.g., fur, brick, bark, sky), blending effects, translucence effects, and the like, which may be applied to the rendered geometry.

Figure 2:
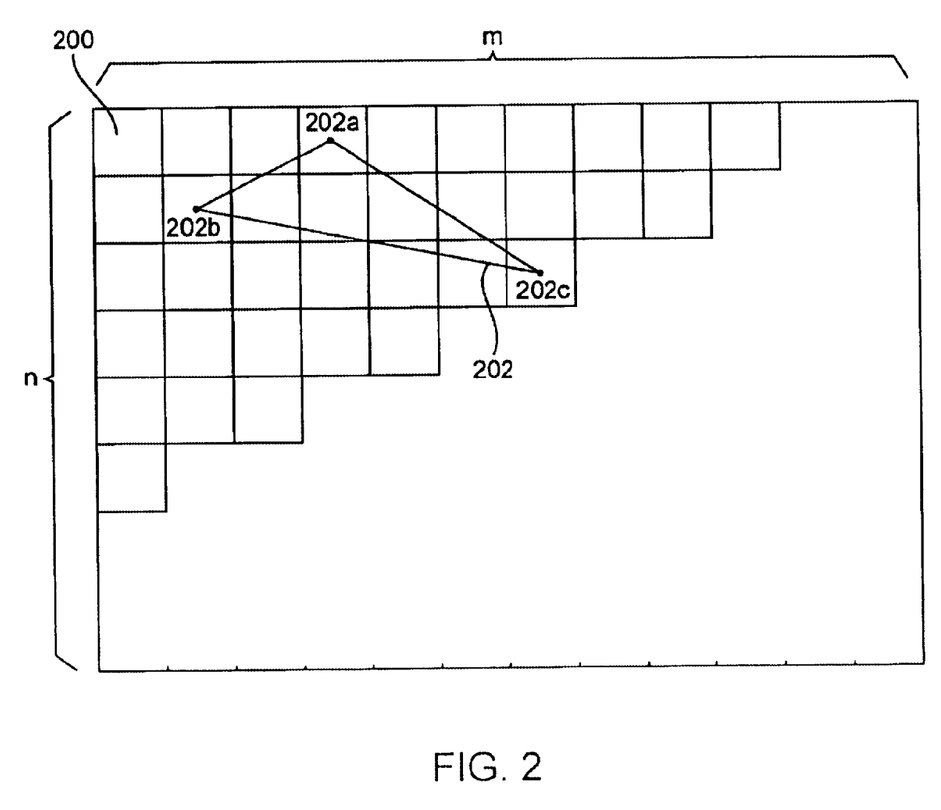
FIG. 2 illustrates a portion of an exemplary frame comprising a number of tiles.

Geometry processor 110 supplies the graphics data to a binning engine 112. Using the graphics data, binning engine 112 reproduces the associated geometries and modes in an image frame which comprises a plurality of grid-like regions referred to as tiles. FIG. 2 shows a portion of a frame segmented into a number of tiles. A tile may be defined, for example, by a 32 pixel by 32 pixel square area of the frame. Binning engine 112 determines which tiles are "touched" by each geometry. For every tile, the graphics data for each geometry touching the tile is linked to the tile. This linked data is output by binning engine 112 per tile. A memory controller 114 is coupled to binning engine 112 and routes the tile data for storage into various portions, or bins, of a graphics memory 116. The portion of graphics memory 116 that is designated for storing binning data is sometimes referred to herein as binning memory. A rendering engine 118 is coupled to memory controller 116 and accesses the binned graphics data contained in graphics memory 116 to render an image for display. The process of rendering an image is thus optimized by storing graphics data into local graphics memory (or binning memory) such that it can be readily retrieved by rendering engine 118 to generate an image frame.

It is to be understood that the various functional blocks in the graphics system 100 may be implemented by a combination of hardware and/or software, and that in specific implementations some or all of the functionality of the various blocks may be combined into an integrated solution. For example, while the diagram shows graphics memory 116 as a separate block from graphics processor 102, a certain amount of memory for binning or other purposes may be provided in the graphics processor block. Another implementation may combine interface controller and graphics processor, and combine graphics and system memory resources into an integrated chipset. Also, in alternative embodiments, the binning function may be implemented by software on a general purpose CPU or DSP.

As part of the binning process, binning engine 110 defines each tile by a tile descriptor which includes, among other tile-specific information, pointers to locations in the binning memory where binned data corresponding to that tile is stored. During the binning process, binning memory may become unavailable under a variety of conditions. One example is the rendering of an infinite loop which may exhaust binning memory. In some applications, binning memory may become unavailable because it is shared dynamically with other resources, or when a preset time is elapsed, or an application program desires to read back intermediate buffers. When any one of these, or other similar, conditions occurs the graphics processor, according to the present invention, may initiate a flush by generating, for example, a flush signal.

Figure 3:
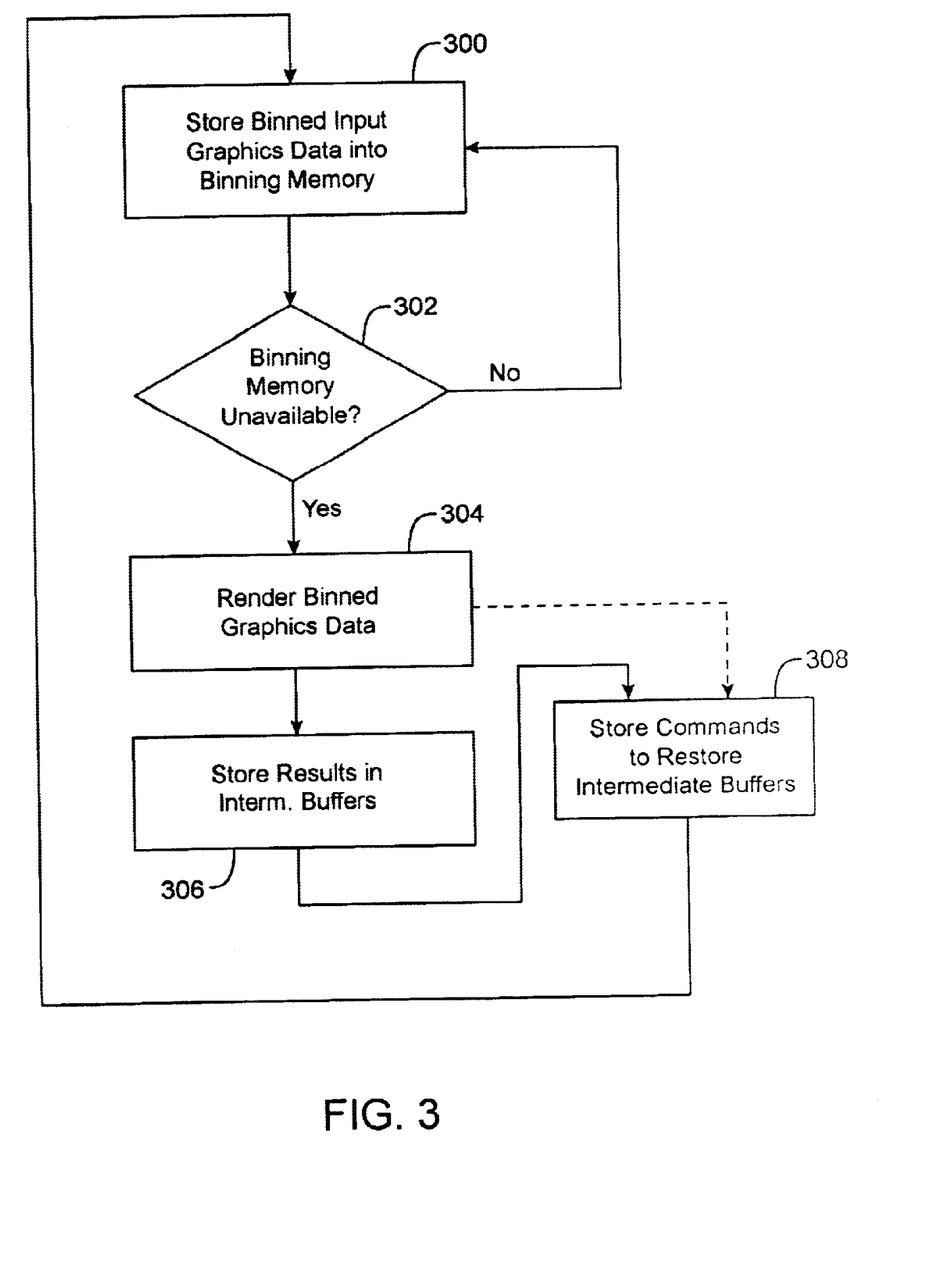
FIG. 3 is a simplified flow diagram illustrating binning flush according to the present invention.

Referring to FIG. 3, there is shown a simplified flow diagram illustrating one embodiment of the binning flush process according to the present invention. As long as binning memory is available, input graphics data (geometry and commands) are binned by binning engine 112, and then stored in binning memory 116 (steps 300 and 302). The term "commands" as used herein is intended to cover both, mode data that is typically tile specific, as well as true commands that are typically broadcast to all tiles. Once the processor determines that binning memory has become unavailable, a flush signal is asserted initiating the flush process. Upon initiating a flush, all geometry in each tile is rendered by the rendering engine (step 304) and the results stored in temporary storage or intermediate buffers (step 306). The intermediate buffers may be in the form of memory that is integrated on the same chip as the graphics processor or may be external to the graphics chip. As binned geometry is rendered, binning memory is freed up and made available. In order to continue adding arbitrary commands and geometry to a tile after flushing out the results, special restore commands are first added to the tile descriptor to restore those results. The stored results are thus restored when processing for each tile is resumed (step 308).

Since binning memory is freed during the rendering process, double-buffering the tile descriptors allows for performing in parallel (shown by the broken line in FIG. 3) the rendering process (step 304) and the binning of restore commands (step 308). That is, double-buffered tile descriptors enable the pipeline to receive and process new input commands as already binned geometry are being rendered. Alternatively, the storing and the restoring process (steps 306 and 308) would occur serially after the rendering process (step 304). In an exemplary embodiment, high density memory such as dynamic random access memory (DRAM) devices are used for binning memory, and high speed memory such as static random access memory (SRAM) devices are used to implement the rendering buffers (e.g., color, depth, stencil, etc.). These memories may be either off chip or embedded on the graphics processor chip.

The above embodiment for binning flush allows a tiled architecture to correctly handle the infinite rendering class of applications. Most applications, however, do not render infinitely complex images. More typically, an application renders some finite amount of geometry per image, which may or may not fit into the allocated amount of binning memory. The above flush algorithm imposes a "knee" in the performance of the 3-D graphics pipeline due to the fact that it processes all of the binned data and stores and reloads all intermediate data even in cases where only a small additional amount of memory is required to complete the scene.

In another embodiment, the present invention provides an algorithm which avoids the above all-or-nothing characteristic. According to this embodiment, flushing is performed incrementally on a tile-by-tile basis, starting, preferably, from the tile with the largest amount of binned data. With reference to the flow diagram of FIG. 4, the incremental binning flush, according to the present invention, processes binned data until a flush condition is signaled (steps 400 and 402). In response to the flush signal, one tile is selected for rendering (step 404). In a preferred embodiment, the first selected tile is one with the largest amount of binned data. The tile descriptor for the selected tile is then copied to a special tile descriptor, and the original tile descriptor is marked as "empty" (step 406). All geometry binned for the selected tile is then rendered which frees binning memory associated with this tile as it is processed (step 408). The results of rendering are stored into intermediate buffers (step 410). Next, the binning engine bins restore commands for the selected tile which restore data from the intermediate buffers into the rendering buffers (step 412), and continues binning.

Figure 4:
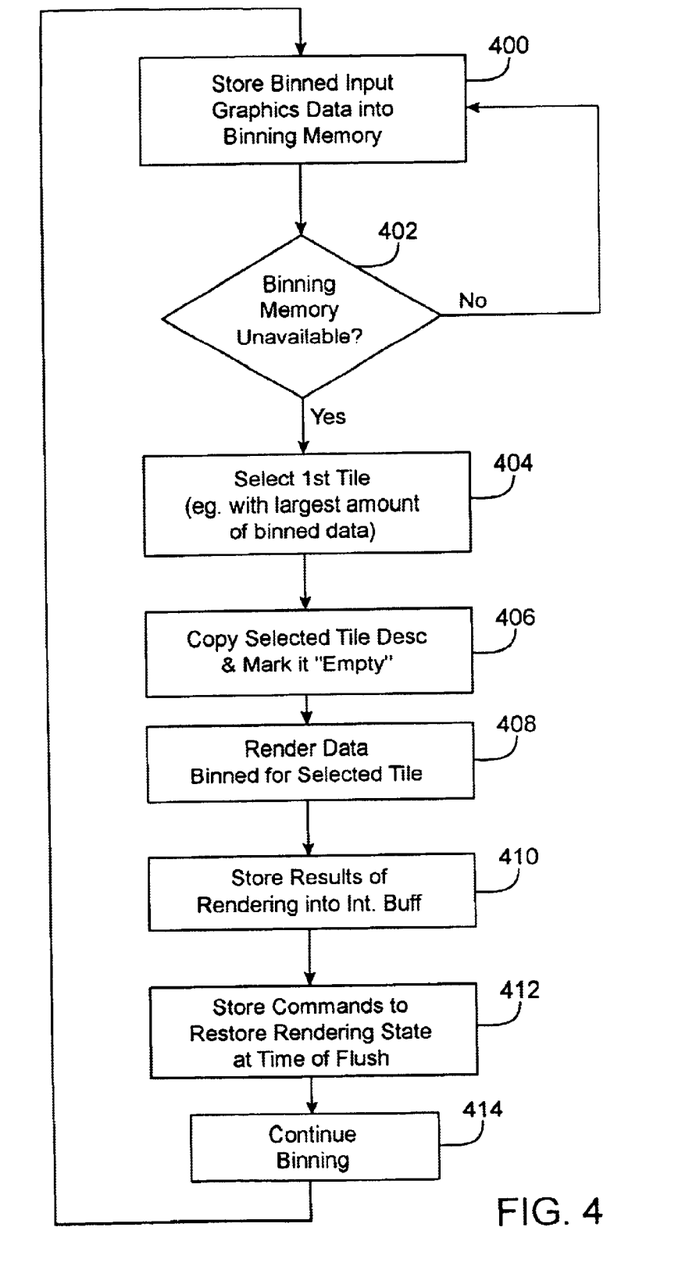
FIG. 4 is a simplified flow diagram illustrating a tile-by-tile embodiment of the binning flush according to the present invention.

The copying and "emptying" of the tile descriptor for the selected tile allows the tile descriptor to receive new input as the geometry associated with the special tile descriptor (copy of selected tile descriptor) are being rendered. Since the rendering process frees the binning memory which the special tile descriptor points to, the input process will be able to reuse this freed binning memory for the original tile descriptors as new input is processed. The input processing is therefore rate-limited by how fast the rendering process can free the memory associated with the special tile descriptor.

Figure 5A:
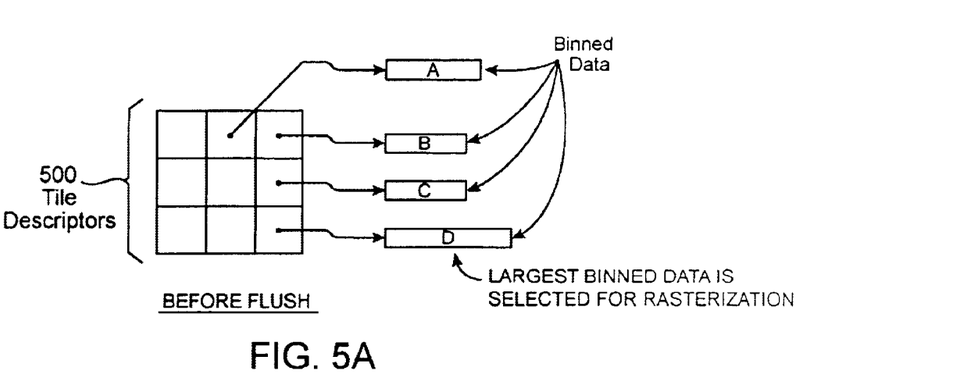
FIGS. 5A, 5B, and 5C illustrate the state of various binning resources before and after a flush.
Figure 5B:
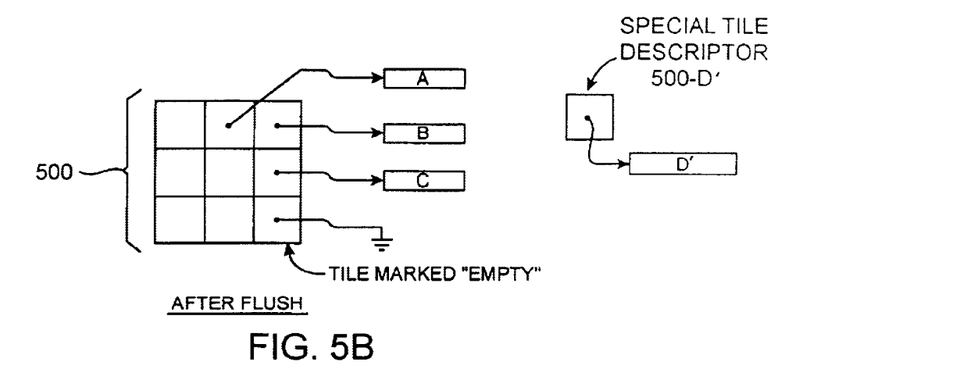
Figure 5C:
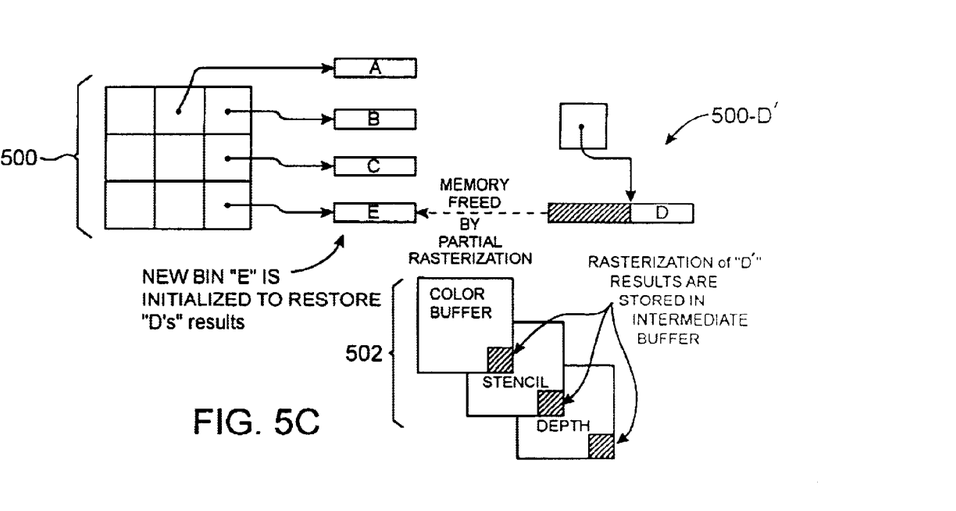

The storing of the results is accomplished by the flush hardware, that may reside in rendering engine 118, immediately initializing the newly emptied tile descriptor with commands to store the results of rendering into rendering buffers; This process is further illustrated schematically in FIGS. 5A–5C. The pre-flush state of a simplified 3×3 grouping of tiles 500, some of which have been binned, is shown in FIG. 5A where the lower right corner tile 500-D contains the largest amount of binned data "D". FIG. 5B illustrates the state of the tile descriptors immediately after a flush begins. The lower right corner tile 500-D is copied into a separate special tile descriptor 500-D', and then marked "empty." FIG. 5C illustrates how as binned data D is rendered and binning memory associated therewith freed, a new tile descriptor "E" in place of the previously emptied tile descriptor is initialized to restore the results of the rendering of D, while tile descriptor 500-D' has commands appended to store it's results into intermediate buffers 502. Restore commands are then binned (not shown) before binning of further tiles continues.

Figure 6:
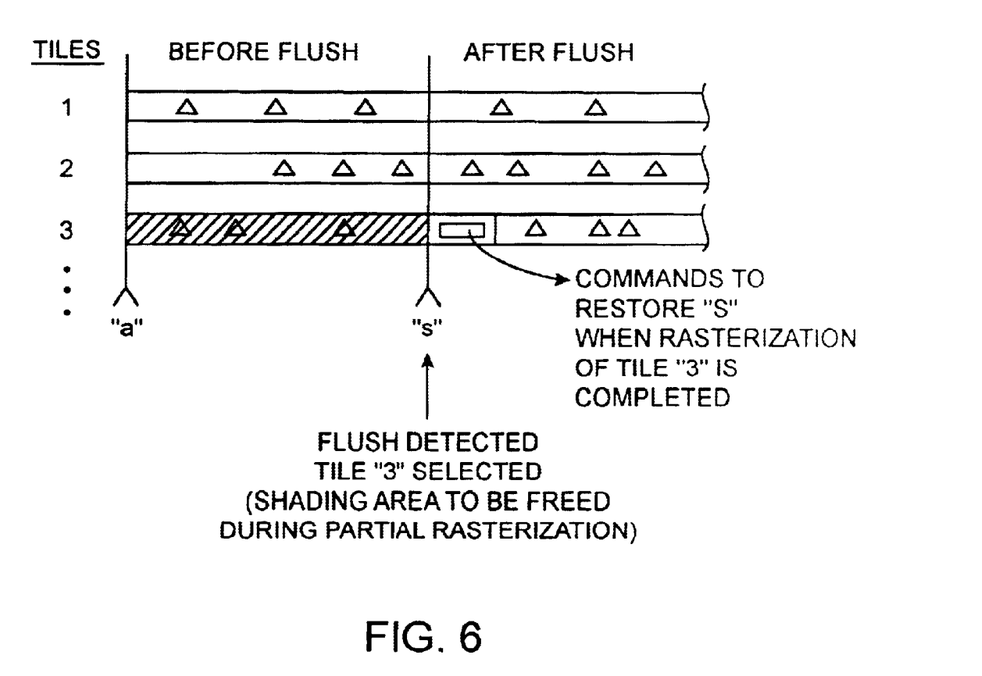
FIG. 6 illustrates the process of pipeline state management during a partial flush according to one embodiment of the present invention.

For the tile-by-tile approach to work properly, the present invention keeps track of the state changes of the pipeline each time a tile is flushed. The process of state management during a partial flush according to the present invention is illustrated in FIG. 6. According to one embodiment, before receiving and processing input geometry and command, all tiles share one global initial rendering state vector "a". As the input data stream containing geometry and mode change information is processed, the rendering state vector is transformed. When a flush is detected, the selected tile thus has a different rendering state "s". Since the commands between "a" and "s" are discarded for the selected tile when it is rendered and its contents are freed, the flush hardware, according to the present invention, either records the entire state vector "s" into the newly emptied tile descriptor, or more optimally records just the difference between "a" and "s" into the tile descriptor. That is, the tile descriptor is initialized with commands to recreate rendering state "s" when rendering of the selected tile is completed at the end of frame. Binning resumes once this new tile has been synthesized.

In a specific embodiment, the present invention provides enough total binning memory such that every tile can hold the maximum needed buffer and state restoration commands, and at least one tile can contain one polygon's worth of geometry. Given this minimum amount of memory, forward progress can always be made since every partial flush will at least process one polygon. Since an out-of-binning-memory condition is never signaled while the rendering engine has tile(s) to process, the above algorithm does not need to worry about partially flushing the same tile recursively. If the rendering engine is busy processing a tile, the binning engine simply stalls until the rendering engine frees some of the tile's memory.

The flush implementation according to the present invention as described thus far requires that intermediate buffers, such as color, depth and stencil buffers, have a region of memory reserved for the storage and retrieval of the partially rendered results during the flush. This static region is therefore not available for use as texture or binning memory, but at the same time is seldom used in a well-tuned system because, in general, scenes that cause a flush are atypical and binning memory resources are allocated such that the majority of real applications never need to flush.

In one embodiment, the present invention substantially reduces or totally eliminates the intermediate buffer memory required to hold partial flush results. The size of the intermediate buffers can be substantially reduced by periodically interrupting the flush or restore process, and allowing the host processor (CPU 104 in FIG. 1) to copy partial flush results to or from much cheaper system memory (108 in FIG. 1). The present invention accomplishes this, in one embodiment, by raising an interrupt after a predetermined number of tiles have been processed during a flush. In response to the interrupt, the rendering engine halts and waits for the host processor to move data between expensive local/AGP memory and system memory. Once the transfer takes place the host processor signals the rendering engine to resume processing. Partial flush results are stored into locations inside, for example, local memory, calculated by masking off some number of the most significant bits (MSBs) of the tile X and Y positions. By coupling the tile count which generates interrupts and the number of MSBs of the tile position that are masked, it becomes possible to implement several different update strategies such as double-buffering to allow concurrent rendering and data movement by the host processor. This mechanism also allows the device driver to decide what amount of memory to reserve for flush buffers, ranging from a single tile's worth of buffers, half-a-line, line-at-a-time, two double-buffered lines, etc. up to the passthrough full-buffer case. To provide further flexibility, the number of tiles before an interrupt is raised can be made programmable.

In an alternative embodiment, since binning memory is freed during the rendering process, the present invention renders the tiles during a flush and stores the resulting buffers back into binning memory, obviating the need for additional static buffers. The storing/restoring process uses the same binning memory allocators as the binning process itself. This method will work as long as the total amount of binning memory is large enough to hold the full set of intermediate buffers plus at least one polygon per tile. The flush can then process the tiles in size order, from the largest to the smallest in terms of binning memory occupied. Alternatively, instead of performing the full sort of the tiles by size, a simpler approach is to perform two passes; the first pass processing only tiles large enough such that the resulting data in the intermediate buffers will fit into the binning memory freed when rendering the tile, and the second pass processing all remaining tiles. This can be shown to be deadlock free. This method also permits various lossless compression schemes to be applied to the intermediate data (color, depth, stencil, etc.) since the resulting variable-sized compressed blocks of data can be handled efficiently by a binning memory allocator that dynamically allocates variable length memory to intermediate data. Any additional memory made available by the compression is usable by the binner when input processing continues.

The present invention thus provides methods and apparatus for optimizing graphics data processing. Various binning flush algorithms have been described to optimize the utilization of binning memory in a graphics system. While the above provides a detailed description of certain specific embodiments of the invention, various alternatives, modifications and equivalents are possible. For example, the storing of partially rendered results during a flush according to the present invention need not be limited to any one type of memory resource. A number of different memory resources including system memory, binning memory as well as intermediate buffers can be used in various combinations for storing such data. Also, the incremental flush process need not start with the tile with the largest amount of binned data. Nor does it have to start with only one tile. The scope of the present invention is thus not limited to the specific embodiments described, and is instead defined by the following claims and their full breadth of equivalents.

What is claimed is:

1. In a graphics data processing system wherein the image rendering area is divided into a plurality of tiles, a binning flush process comprising:

generating a flush signal when binning memory becomes unavailable;

in response to the flush signal, for each tile, rendering binned geometry and storing the results into memory;

binning restore commands, the restore commands restoring data generated during partial tile rendering;

retrieving the stored results of one or more tiles from memory according to the binned restore command of each tile; and continuing with binning input geometry and commands for the one or more retrieved tiles.

2. The binning flush process of claim 1 wherein the results of rendering are stored in intermediate buffers that are local to binning and rendering hardware.

3. The binning flush process of claim 2 wherein instead of storing all the results of rendering into intermediate buffers, the binning flush process stores some or all the results into other existing memory resources.

4. The binning flush process of claim 3 wherein storing of results of rendering binned geometry into other existing memory resources comprises:

interrupting the flush process; and copying partial flush results to or from other existing memory resources.

5. The binning flush process of claim 4 wherein the interrupting occurs after the flush process has processed a predetermined number of tiles.

6. The binning flush process of claim 5 wherein the predetermined number of tiles is digitally programmable.

7. The binning flush process of claim 3 wherein the other existing memory resources comprises system memory.

8. The binning flush process of claim 3 wherein the other existing memory resources comprises binning memory.

9. The binning flush process of claim 8 wherein the flush process processes binned tiles in size order from the largest to the smallest in terms of binning memory occupied.

10. The binning flush process of claim 8 wherein the flush process first processes tiles with binned data that is large enough such that the resulting intermediate buffers will fit into binning memory freed when rendering the tile, and then processes the remaining tiles.

11. The binning flush process of claim 1 wherein binning restore commands occurs in parallel with rendering binned geometry.

12. In a graphics data processing system wherein the image rendering area is divided into a plurality of tiles, a binning flush process comprising the steps of:

generating a flush signal when binning memory becomes unavailable;

in response to the flush signal, selecting a tile;

copying a tile descriptor for the selected tile to a special tile descriptor, and marking the original tile descriptor as "empty";

rendering geometry binned for the selected tile which frees binning memory associated with this tile as it is processed;

storing the results of rendering into memory;

binning restore commands for the selected tile; and continuing binning;

wherein the tile is selected according to the size of its binned data.

13. The binning flush process of claim 12 wherein the selected tile is a tile with the largest amount of binned data.

14. The binning flush process of claim 12 wherein the storing of the results of rendering into memory comprises:

appending commands to the tile descriptor to store the results; and initializing the tile descriptor marked "empty" with commands to restore the results of rendering.

15. The binning flush process of claim 12 wherein the flush process further comprises keeping track of rendering state vectors when a flush occurs.

16. The binning flush process of claim 15 wherein the keeping track of rendering state vectors comprises recording the rendering state vector when a flush is signaled, and recreating it before continuing binning.

17. The binning flush process of claim 15 wherein the keeping track of rendering state vectors comprises:

initializing all tiles to a global rendering state vector;

detecting a rendering state vector of tiles at time of flush;

recording a difference between the global rendering state vector and the state vector at time of flush; and recreating the rendering state vector at time of flush before resuming binning.

18. The binning flush process of claim 12 wherein the results of rendering are stored in intermediate buffers that are local to binning and rendering hardware.

19. The binning flush process of claim 18 wherein instead of storing all the results of rendering into intermediate buffers, the binning flush process stores some or all the results into other existing memory resources.

20. The binning flush process of claim 19 wherein storing of results of rendering binned geometry into other existing memory resources comprises:

interrupting the flush process; and copying partial flush results to or from other existing memory resources.

21. The binning flush process of claim 20 wherein the interrupting occurs after the flush process has processed a predetermined number of tiles.

22. The binning flush process of claim 21 wherein the predetermined number of tiles is digitally programmable.

23. The binning flush process of claim 19 wherein the other existing memory resources comprises system memory.

24. The binning flush process of claim 19 wherein the other existing memory resources comprises binning memory.

25. The binning flush process of claim 24 wherein the flush process processes one or more binned tiles in size order from the largest to the smallest in terms of binning memory occupied.

26. The binning flush process of claim 24 wherein the flush process first processes tiles with binned data that is large enough to contain their own intermediate buffers, and then processes the remaining tiles.

27. A graphics processor wherein the image rendering area is divided into a plurality of tiles, the graphics processor comprising:

a binning engine coupled to receive input graphics data and configured to organize the input graphics data into bins defined by tiles touched by the input data;

a memory controller coupled to the binning engine;

binning memory coupled to the memory controller and configured to store data binned by the binning engine; and a rendering engine coupled to the memory controller and configured to retrieve binned data from the binning memory and to render retrieved binned data, wherein, when binning memory becomes unavailable, the graphics processor initiates a flush process whereby already binned data is processed freeing up binning memory to continue binning; and wherein the already binned data is selected by the flush process for processing according to its size.

28. A computer system comprising:

a central processing unit (CPU);

system memory coupled to the CPU;

a graphics processor as set forth in claim 27, coupled to the CPU.

29. The computer system of claim 28 wherein the system memory and the binning memory are unified.

* * * * *